(12) United States Patent
Blain et al.

(10) Patent No.: US 11,485,075 B2
(45) Date of Patent: Nov. 1, 2022

(54) HIGH VOLUME MANUFACTURING METHOD FOR PRECISION ARTICLES BASED ON THREE-DIMENSIONAL PRINTING

(71) Applicant: 3D Systems, Inc., Rock Hill, SC (US)

(72) Inventors: Colin Leonard Blain, Rock Hill, SC (US); Joseph Chang, Rock Hill, SC (US); Evan Kuester, Rock Hill, SC (US)

(73) Assignee: 3D SYSTEMS, INC., Rock Hill, SC (US)

( * ) Notice: Subject to any disclaimer, the term of this patent is extended or adjusted under 35 U.S.C. 154(b) by 50 days.

(21) Appl. No.: 16/950,516

(22) Filed: Nov. 17, 2020

(65) Prior Publication Data

US 2021/0146614 A1 May 20, 2021

Related U.S. Application Data

(60) Provisional application No. 62/936,931, filed on Nov. 18, 2019.

(51) Int. Cl.
| | |
|---|---|
| *B29C 64/171* | (2017.01) |
| *B29C 64/393* | (2017.01) |
| *B33Y 10/00* | (2015.01) |
| *B33Y 50/02* | (2015.01) |
| *B29L 31/00* | (2006.01) |
| *B33Y 80/00* | (2015.01) |
| *B33Y 30/00* | (2015.01) |

(52) U.S. Cl.
CPC .......... *B29C 64/171* (2017.08); *B29C 64/393* (2017.08); *B29L 2031/7739* (2013.01); *B33Y 10/00* (2014.12); *B33Y 30/00* (2014.12); *B33Y 50/02* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 5,595,703 A | * | 1/1997 | Swaelens | B33Y 40/00 427/512 |
| 6,558,606 B1 | * | 5/2003 | Kulkarni | B33Y 10/00 264/401 |
| 9,703,898 B2 | | 7/2017 | Zenere | |
| 10,000,011 B1 | * | 6/2018 | Mark | B22F 10/43 |
| 2014/0316549 A1 | * | 10/2014 | Zenere | G06F 30/00 700/120 |

FOREIGN PATENT DOCUMENTS

WO WO-2015143007 A2 * 9/2015 ............... B08B 7/02

* cited by examiner

*Primary Examiner* — Alexander M Weddle

(57) ABSTRACT

A three-dimensional printing system includes a print engine and a controller. The controller in turn includes a processor coupled to a non-transient memory. The non-transient memory stores software instructions that when executed by the processor cause the controller to operate the print engine to fabricate a body. The body includes a three-dimensional arrangement of 3D articles that are pairwise coupled together. An individual pair of the arrangement of 3D articles includes a first article and a second article. A curved body couples a first surface of the first article to the second article. The curved body intersects the first surface to define a closed intersection curve that bounds a break surface. Along the closed intersection curve a surface of the curved body subtends an acute angle with the first surface.

11 Claims, 5 Drawing Sheets

HIGH VOLUME MANUFACTURING METHOD FOR PRECISION ARTICLES BASED ON THREE-DIMENSIONAL PRINTING

CROSS-REFERENCE TO RELATED APPLICATIONS

This non-provisional patent application claims priority to U.S. Provisional Application Ser. No. 62/936,931, Entitled "High Volume Manufacturing Method for Precision Articles Based on Three-Dimensional Printing" by Colin L. Blain et al., filed on Nov. 18, 2019, incorporated herein by reference under the benefit of U.S.C. 119(e).

FIELD OF THE INVENTION

The present disclosure concerns an apparatus for a manufacture of articles from processes that include additive manufacturing. More particularly the present disclosure concerns a very efficient and precise method for three-dimensionally printing and separating large quantities of small three-dimensional (3D) articles.

BACKGROUND

Additive manufacturing is in wide use for prototyping and manufacture of high value articles. One challenge facing a wider adoption of additive manufacture is cost and quality compared to alternatives. A key advantage of additive manufacturing is a rapid turn-around of design changes and customization. There is an ever present desire to bring the advantages of additive manufacturing to higher volume manufacturing applications.

SUMMARY

Figure 1:
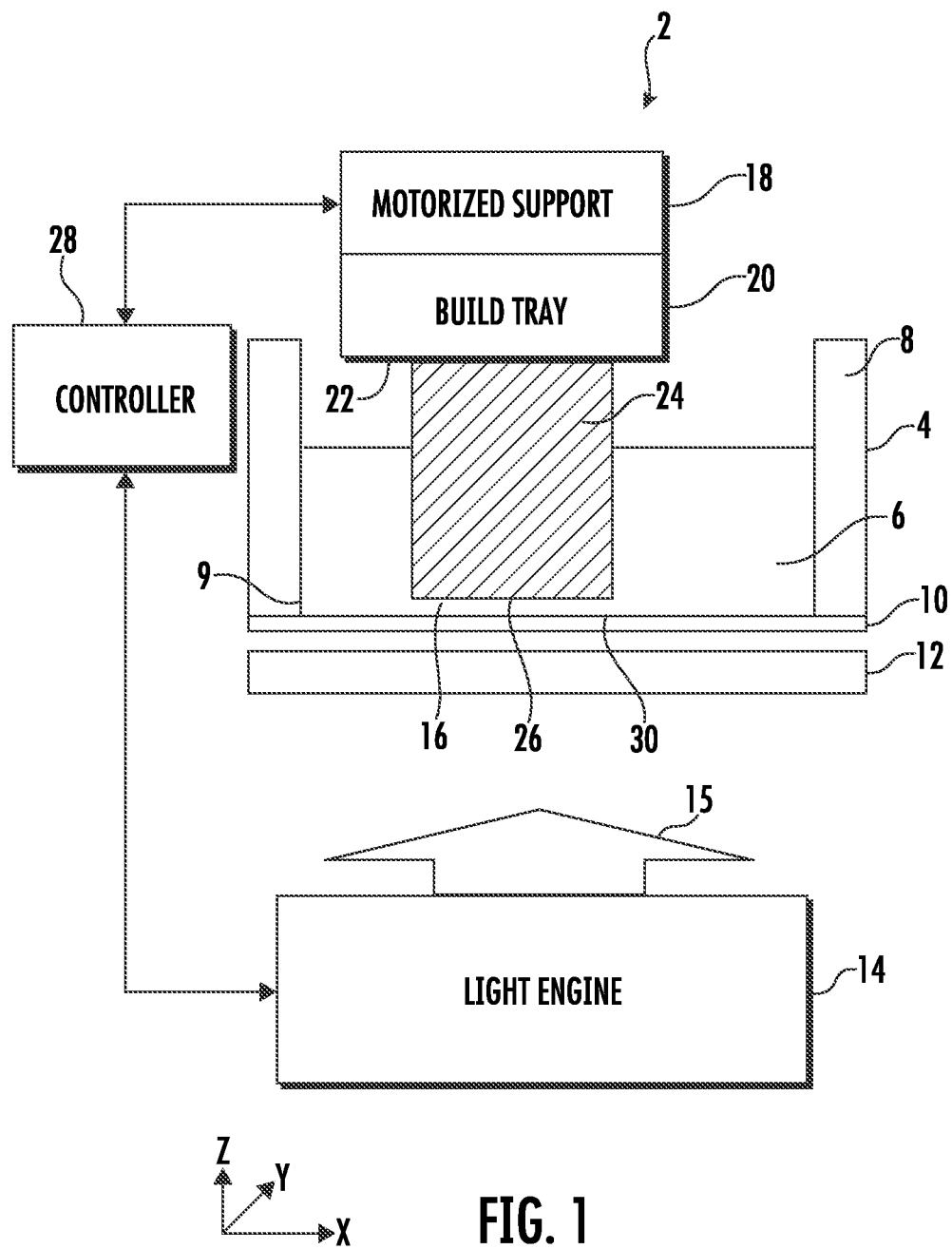
FIG. 1 is a schematic diagram of a print engine coupled to a controller.

In a first aspect of the present disclosure, a three-dimensional printing system includes a print engine and a controller. The controller in turn includes a processor coupled to a non-transient memory. The non-transient memory stores software instructions that when executed by the processor cause the controller to operate the print engine to fabricate a body. The body includes a three-dimensional arrangement of articles that are pairwise coupled together. An individual pair of the arrangement of articles includes a first article and a second article. A curved body couples a first surface of the first article to the second article. The curved body intersects the first surface to define a closed intersection curve that bounds a break surface. Along the closed intersection curve a surface of the curved body subtends an acute angle with the first surface.

This provides a very efficient way to manufacture a large quantity arrangement of articles. The pairwise connection of articles with the acute angle assures very predictable breaks between the articles with little damage when breaking them apart.

In one implementation the curved body is an ellipsoid. The curved body can be spherical and provide a generally circular closed intersection curve.

In another implementation the acute angle is in a range of 10 to 40 degrees. This is an optimal range for providing a sufficiently long closed intersection curve to provide enough strength but at the same time to minimize post-break scarring.

In yet another implementation, the curved body has a major axis or diameter. The major axis or diameter has a dimension 0.025 millimeters to 3 millimeters or more particularly from 0.1 millimeters to 1 millimeter. This is an optimal dimensional range for providing a sufficiently long closed intersection curve to provide enough strength but at the same time to minimize post-break scarring. The exact dimension is selected based partly upon an overall size of the articles.

In a further implementation the arrangement of articles includes at least 50 articles with at least 40 pairwise connections. The articles can be all similar or identical to each other. The present system provides a way to efficiently manufacture a large number small articles.

In a second aspect of the disclosure, a method of manufacturing a plurality of articles by an additive manufacturing system includes the following steps: (1) Receiving a solid model for an article. (2) Defining a three-dimensional arrangement of a plurality of articles based on the solid model that are pairwise coupled together. An individual pair of the arrangement of articles includes a first article and a second article. A curved body couples a first surface of the first article to the second article. the curved body intersects the first surface to define a closed intersection curve that bounds a break surface. Along the closed intersection curve a surface of the curved body subtends an acute angle with the first surface. (3) Sending the defined arrangement of articles to a print engine. (4) Operating the print engine to fabricate the arrangement of articles. (5) Unloading the array of articles from the print engine. (6) Loading the array of articles into an agitation apparatus. (7) Operating the agitation apparatus to separate the three-dimensional arrangement of the plurality of articles into individual articles. The three-dimensional arrangement of articles define a plurality of pairwise couplings. The operation of the agitation apparatus breaks at least 95% of the pairwise couplings along the break surface. The disclosed method provides a way of efficiently manufacturing a large number of similar or identical articles.

DETAILED DESCRIPTION OF THE PREFERRED EMBODIMENTS

FIG. 1 is a schematic diagram of an embodiment of a three-dimensional print engine 2. In describing print engine 2, axes X, Y, and Z can be used. Axes X and Y are generally horizontal and axis Z is generally vertical and generally aligned with a gravitational reference. As discussed herein, the term "generally" refers to having a dimension, an angle, or other parameter that is within manufacturing or placement tolerances.

Print engine 2 includes a resin vessel 4 for containing resin 6. Resin vessel 4 includes a vessel body 8 that defines a central opening 9. The central opening 9 is closed by a transparent sheet 10. The transparent sheet 10 is formed from an optically clear material that has a permeability to a reaction inhibitor such as oxygen (from ambient air or from another oxygen source).

The resin vessel 4 is supported by a support plate 12. The support plate 12 includes a central transparent opening and/or plate (to be shown in subsequent figures) that is laterally aligned with the transparent sheet 10. A light engine 14 is configured to project pixelated light 15 up through the support plate 12, through the transparent sheet 10, and to a build plane 16 within the resin 6. The build plane 16 is a lateral region of the resin 6 that can be imaged by the light engine 14.

A motorized support 18 is configured to vertically position a build tray 20. Build tray 20 has a surface 22 for supporting a three-dimensional fabricated body 24 being fabricated by system 2. The fabricated body 24 has a distal surface 26 that is in facing relation with the transparent sheet 10 and is proximate to the build plane 16.

The motorized support 18 is a motorized device for vertically positioning the build tray 20 and outputting an encoder signal that is indicative of a vertical position of the build tray 20. In an illustrative embodiment, the motorized support 18 includes a vertically fixed portion and a vertically moving portion. The vertically moving portion supports the build tray and includes a threaded bearing. The vertically fixed portion includes a motor coupled to a lead screw which is received within the threaded bearing. As the motor rotates the lead screw, the action upon the threaded bearing translates the build tray up or down, depending upon the rotational direction of the lead screw.

A controller 28 is coupled to the print engine 2 and the light engine 14 and the motorized support 18. Controller 28 includes a processor coupled to an information storage device. The information storage device includes a nonvolatile or non-transient storage device storing software instructions. When the software instructions are executed by the processor, they operate the light engine 14 and motorized support 18 and perform the following steps: (1) Operate the motorized support 18 to position surface 22 (or afterwards surface 26) at build plane 16. (2) Operate light engine 14 to selectively solidify a layer of resin onto surface 22 or 26. (3) Repeat (1) and (2) to complete fabrication of the fabricated body 24.

As material is being solidified onto surface 22 or 26, there is a inhibited zone 30 of resin immediately adjacent the transparent sheet 10 that does not polymerize. That is because an inhibitor such as oxygen diffuses through the transparent sheet 10 and the inhibited zone 30.

Figure 2:
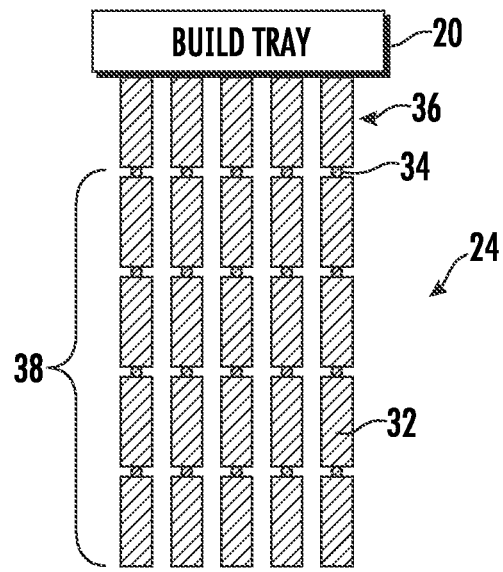
FIG. 2 is a schematic diagram of a three-dimensional arrangement of articles attached to a build tray.

FIG. 2 depicts a side schematic view of build tray 20 supporting a fabricated body 24. The fabricated body 24 can also be referred to as a three-dimensional arrangement 24 of articles 32. In the illustrative embodiment the fabricated body 24 is a large number of relatively small articles 32 that are coupled to the build tray 20 and pairwise coupled to each other by curved bodies 34. As will be discussed in more detail infra, a curved body 34 is configured to break off from one or both of the articles 32 easily and to leave a relatively smooth surface at the break. In the illustrated embodiment, there is a top row (or two dimensional arrangement) 36 of the articles 32 that are directly attached to the build tray 20 and then a plurality of rows 38 that are supported by pair wise connections using the curved bodies 34. In an illustrative embodiment, the articles 32 are small, large in quantity, and similar or identical to each other.

Figure 3:
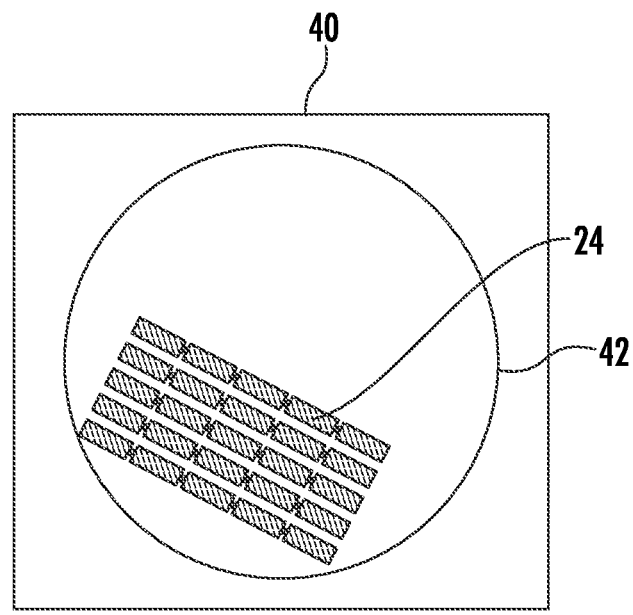
FIG. 3 is a schematic diagram of a three-dimensional arrangement of articles loaded into an agitation apparatus for breaking pairwise couplings between the articles.

FIG. 3 illustrates a schematic view of an agitation apparatus 40 including a rotating drum 42 for separating the 3D articles 32 from each other. After being separated from the build tray 20, the fabricated body 24 is loaded into a drum 42. The agitation apparatus 40 is then operated to rotate the drum 42. The rotation can be enough to cause the 3D articles 32 to break apart and separate at the curved bodies 34. In alternative embodiments, agitation apparatus 40 can utilize vibrations or polishing compounds to enhance operation.

Figure 4A:
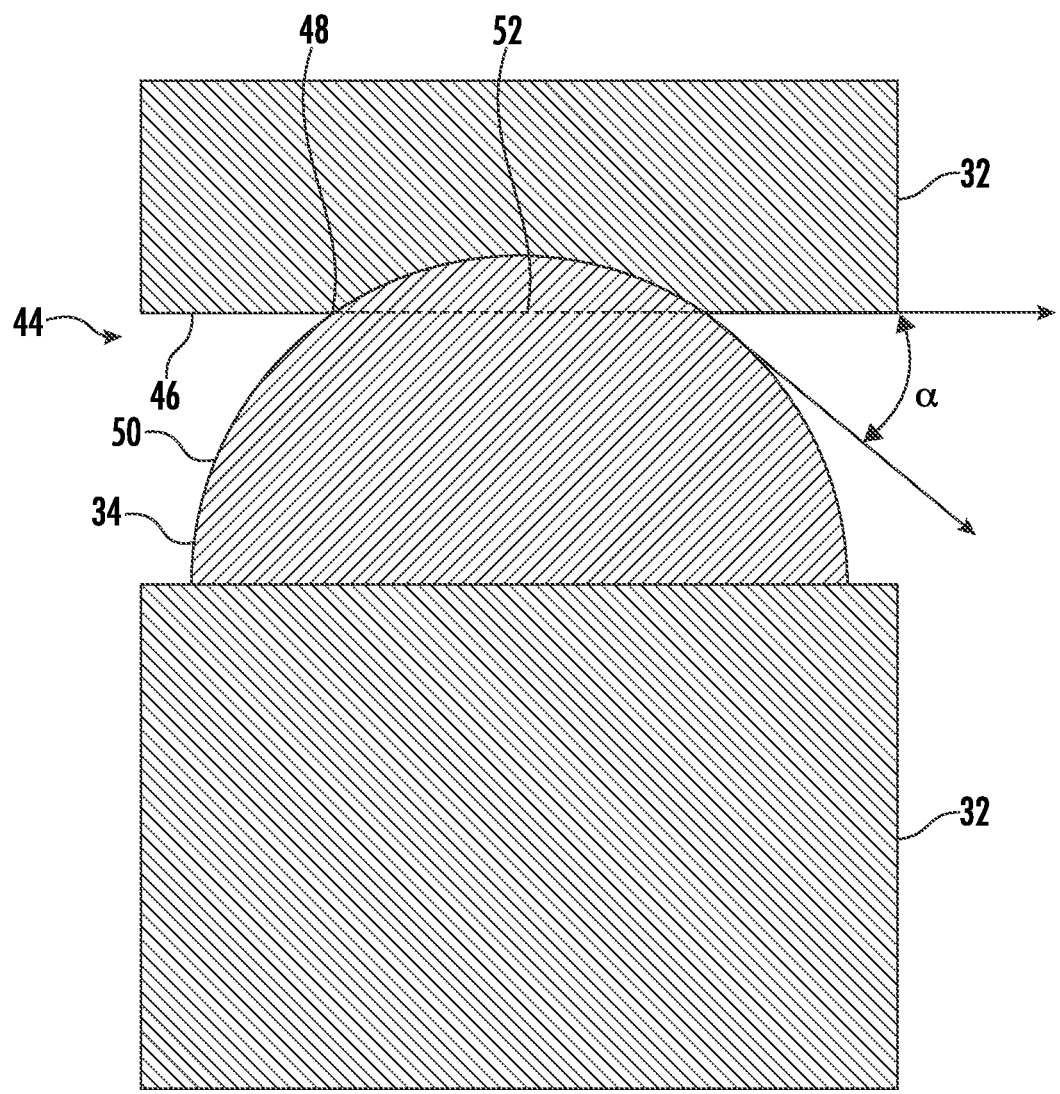
FIG. 4A is a schematic side view of a first embodiment of a pairwise coupling between two articles.

FIG. 4A depicts a first embodiment of a pairwise connection 44 between two 3D articles 32. The pairwise connection 44 is defined by an overlap of a curved body 34 with a surface 46 of an article 32. The connection or overlap 44 is bounded by an intersection curve 48 along the intersection between an outer surface 50 of body 34 and the surface 46. Along the intersection curve 48 surfaces 46 and 50 subtend or define an acute angle $\alpha$. The angle $\alpha$ is less than 45 degrees and preferably in a range of about 10 to 40 degrees. Minimizing the subtended angle provides a flatter broken surface 52 when the body 34 is separated from the article 32.

When a pairwise connection 44 of the two 3D articles 32 is broken, a crack is initiated along the intersection curve 48. With a smaller angle $\alpha$, the crack tends to be more parallel to surface 46. The crack propagates to form the broken surface 52 between the two 3D articles 32. But if the angle $\alpha$ is too small, then the area holding the 3D articles 32 together becomes small and may not be enough to provide handling of the fabricated body 24 before it is loaded into the agitation apparatus 40.

Figure 4B:
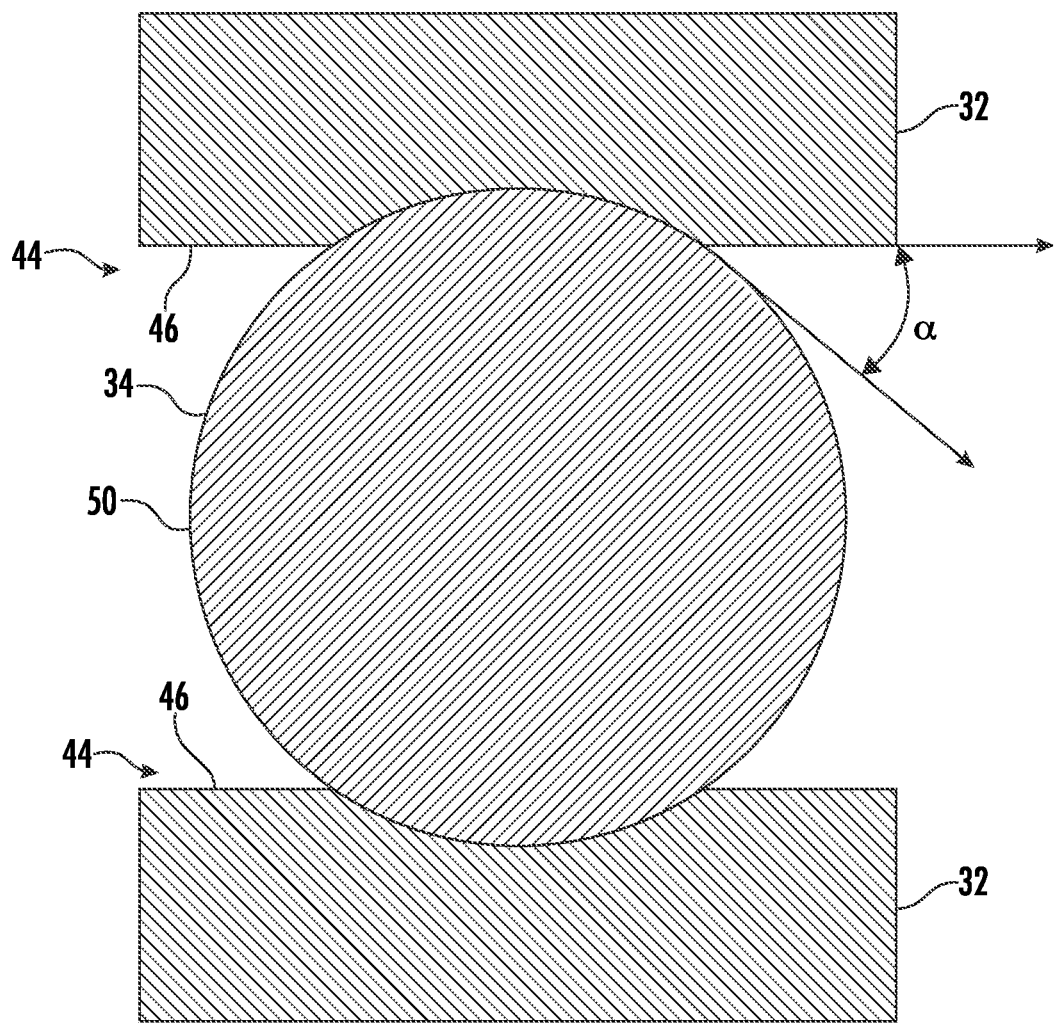
FIG. 4B is a schematic side view of a second embodiment of a pairwise coupling between two articles.

FIG. 4B depicts a second embodiment of a pairwise connection 44 between two 3D articles 32. In this embodiment, the curved body 34 is coupled to two different surfaces 46 of a pair of the 3D articles 32. Otherwise, the second embodiment is similar to that of FIG. 4A.

While FIGS. 3, 4A, and 4B show pairwise connections 44 between horizontal surfaces 46, this method can apply to pairwise connections 44 between vertical or oblique surfaces. Also, an article 32 can have pairwise connections 44 with more than two different other 3D articles 32 with varying geometries for purposes of improving handling of the fabricated body 24.

In the illustrated embodiment of FIGS. 4A and 4B, the body 34 has a spherical outer surface 50. However, the body 34 can have other curved shapes such as an oblate or prolate ellipsoid or other curved shapes such as irregular curved shapes. The curve or intersection 48 that bounds a break surface 52 can be circular, elliptical, irregular, or define some other curved shape. The break surface 52 is illustrated as flat in FIG. 4A, but it can be curved or irregular.

Figure 5:
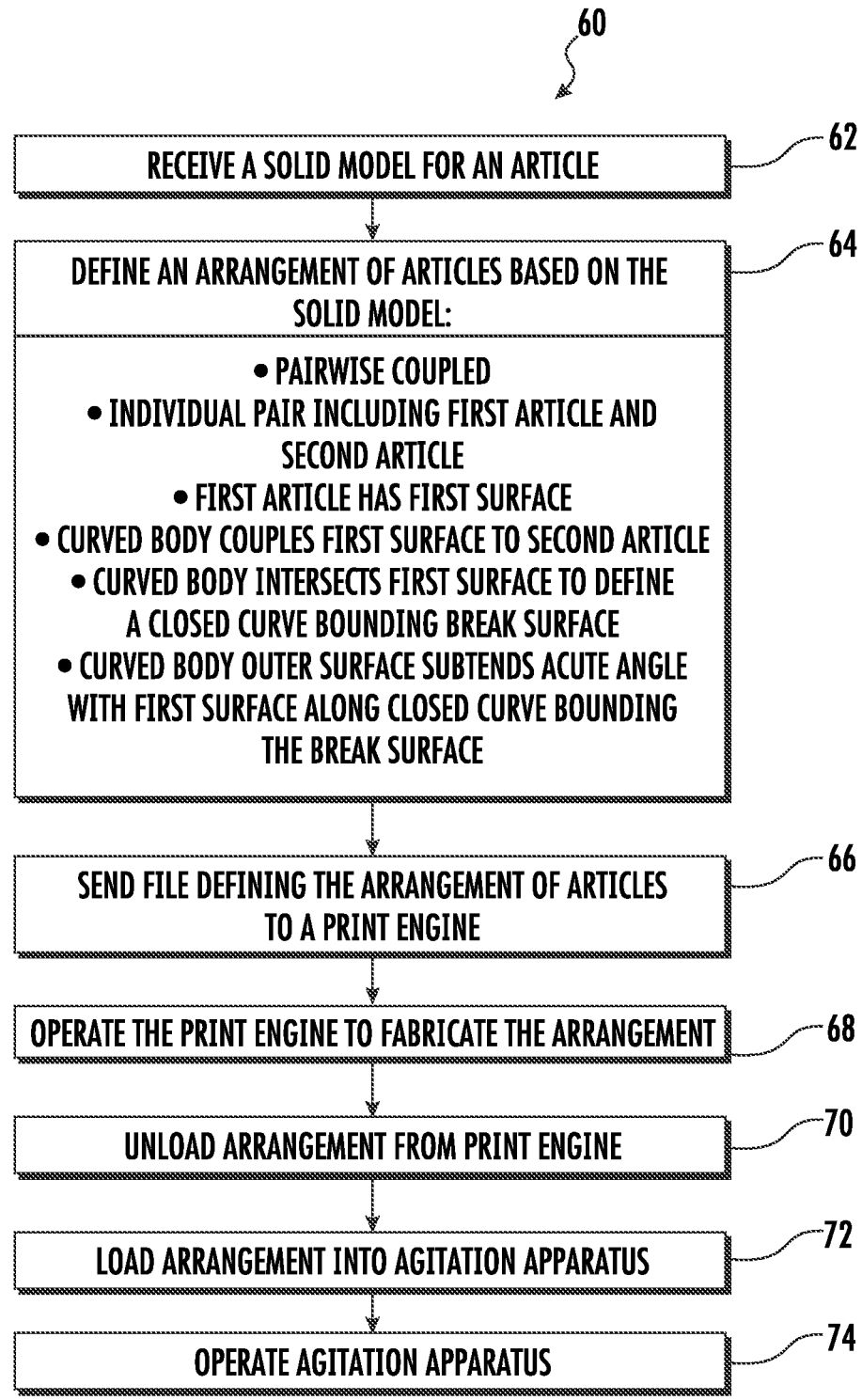
FIG. 5 is a flowchart of an embodiment of a method for manufacturing articles.

FIG. 5 is a flowchart illustrating a method 60 of manufacturing a plurality of 3D articles. According to 62, a controller 28 receives a solid model for an article 32. Article 32 can includes one article design or a plurality of different article designs.

According to 64, the controller 28 defines a three-dimensional arrangement 24 of the 3D articles 32 that are individually based upon the solid model from step 62. The 3D articles 32 of the three-dimensional arrangement 24 are pairwise coupled meaning that every article 32 is coupled as a pair to another article 32 although a given article 32 can be coupled to more than one or two other 3D articles 32 thus defining more than one or more than two pairwise couplings. An individual pair of the 3D articles 32 includes a first article 32 and a second article 32. The first article has a first surface 46 and the second article has a second surface 46.

The three dimensional arrangement 24 also includes a plurality of curved bodies 34 with one curved body 34 for an individual pairwise coupling of two 3D articles 32. The curved body 34 is coupled to the first and second 3D articles 32. The curved body 34 intersects the first surface 46 and defines a closed intersection curve 48 that bounds a break surface 52. Along the closed intersection curve 48, an outer surface 50 of the curved body 34 subtends an acute angle α with respect to the first surface 46.

According to 66, the controller 28 sends a file defining the three-dimensional arrangement 24 of 3D articles 32 to a print engine. The file is based upon step 64. According to 68, the controller 28 operates a print engine 2 to fabricate the three-dimensional arrangement 24 of 3D articles 32.

According to 70, the three-dimensional arrangement 24 of 3D articles 32 is unloaded from the print engine 2. According to 72, the three-dimensional arrangement 24 of 3D articles 32 is loaded into an agitation apparatus 40. According to 74, the agitation apparatus is operated to separate the three-dimensional arrangement 24 of 3D articles 32 into individual 3D articles 32 by causing the 3D articles 32 to break apart along the break surfaces 52.

While FIGS. 1 and 2 illustrate use of a particular three-dimensional print engine 2 it is to be understood that the three-dimensional arrangement 24 of 3D articles 32 can be fabricated by other print engines 2 based upon lasers that polymerize layers of a photocurable resin in a vat. For such other systems, the three-dimensional arrangement 24 may be supported above a support platen and the lasers can solidify layers of resin from above. The three-dimensional arrangement 24 can also be fabricated by other print engines 2 that fuse layers of polymer or metal powder, or dispense materials from a printhead.

The controller 28 may be a single controller that is integrated with a print engine 2 or it can include a plurality of different computers that are locally or remotely located relative to the print engine 2. The controller can include one or more of a local controller, a host computer, a mobile device, a tablet computer, a smartphone, and a server to name some examples.

The agitation device 40 can take other forms than the illustrative embodiment of FIG. 3. Agitation device may utilize one or more of rotational tumbling, vibration, and materials to provide polishing or abrasion.

Method 5 is a way of enabling efficient and cost effective high volume manufacturing of a large number of small three-dimensional (3D) articles 32 that can be similar or identical. The arrangement 24 can includes at least 50 such 3D articles 32 with at least 30 pairwise connections 44. The combination of the geometry of the pairwise connections 44 and the agitation of step 74 provide a very efficient way of providing separated 3D articles 32.

The specific embodiments and applications thereof described above are for illustrative purposes only and do not preclude modifications and variations encompassed by the scope of the following claims.

What is claimed:

1. A method of manufacturing a plurality of 3D articles by an additive manufacturing system comprising:
   receiving a solid model for an article;
   defining a three-dimensional arrangement of a plurality of 3D articles individually based on the solid model that are pairwise coupled together, an individual pair of the arrangement of 3D articles includes a first article and a second article, a curved body couples a first surface of the first article to the second article, the curved body intersects the first surface to define a closed intersection curve that bounds a break surface, along the closed intersection curve a surface of the curved body subtends an acute angle with the first surface;
   sending the defined arrangement of 3D articles to a print engine;
   operating the print engine to fabricate the arrangement of 3D articles;
   unloading the arrangement of 3D articles from the print engine;
   loading the arrangement of 3D articles into an agitation apparatus; and
   operating the agitation apparatus to separate the three-dimensional arrangement of the plurality of 3D articles into individual 3D articles.

2. The method of claim 1 wherein the curved body is an ellipsoid.

3. The method of claim 1 wherein the curved body is generally spherical and the closed and curved intersection is generally circular.

4. The method of claim 1 wherein the curved body has a major axis, the major axis has a dimension in a range of 0.025 to 3 millimeters.

5. The method of claim 1 wherein the curved body has a major axis, the major axis has a dimension in a range of 0.1 to 1 millimeter.

6. The method of claim 1 wherein the acute angle is in a range of 10 to 40 degrees.

7. The method of claim 1 wherein the arrangement of 3D articles includes at least 50 3D articles with at least 30 pairwise connections.

8. The method of claim 1 wherein the three-dimensional arrangement of 3D articles define a plurality of pairwise couplings, the operation of the agitation apparatus breaks at least 95% of the pairwise couplings along the break surface.

9. A method of manufacturing a plurality of separated 3D articles by an additive manufacturing system comprising:
   operating a print engine to fabricate an array of 3D articles that are pairwise coupled together with pairwise connections;
   unloading the array of 3D articles from the print engine;
   loading the array of 3D articles into an agitation apparatus; and
   operating the agitation apparatus to separate the array of 3D articles into the plurality of separated 3D articles by breaking the pairwise connections.

10. The method of claim 9 wherein the array of 3D articles includes at least 50 3D articles with at least 30 pairwise connections.

11. The method of claim 9 wherein operation of the agitation apparatus breaks at least 95% of the pairwise couplings.

* * * * *